United States Patent [19]

Takeuchi

[11] Patent Number: 4,967,891
[45] Date of Patent: * Nov. 6, 1990

[54] RELEASE MECHANISM OF A CLUTCH

[75] Inventor: Hiroshi Takeuchi, Higashiosaka, Japan

[73] Assignee: Kabushiki Kaisha Daikin Seisakusho, Neyagawa, Japan

[ * ] Notice: The portion of the term of this patent subsequent to Feb. 27, 2007 has been disclaimed.

[21] Appl. No.: 251,649

[22] PCT Filed: Nov. 27, 1987

[86] PCT No.: PCT/JP87/00926

§ 371 Date: Aug. 5, 1988

§ 102(e) Date: Aug. 5, 1988

[87] PCT Pub. No.: WO88/04374

PCT Pub. Date: Jun. 16, 1988

[30] Foreign Application Priority Data

Dec. 8, 1986 [JP] Japan ................. 61-292122

[51] Int. Cl.$^5$ ............................. F16D 23/14
[52] U.S. Cl. ..................... 192/98; 192/89 B; 192/DIG. 1
[58] Field of Search ............ 192/70.13, 89 B, 98, 192/110 B, DIG. 1

[56] References Cited

U.S. PATENT DOCUMENTS

| 4,632,237 | 12/1986 | Maycock et al. | 192/98 |
| 4,648,499 | 3/1987 | Despres et al. | 192/98 |
| 4,691,815 | 9/1987 | Maycock et al. | 192/98 |
| 4,702,362 | 10/1987 | Banks et al. | 192/98 |
| 4,733,762 | 3/1988 | Gay et al. | 192/98 |
| 4,733,763 | 3/1988 | Gay et al. | 192/98 |
| 4,733,764 | 3/1988 | Corral et al. | 192/98 |

FOREIGN PATENT DOCUMENTS

| 3713102 | 10/1987 | Fed. Rep. of Germany | 192/98 |
| 58-88229 | 5/1983 | Japan . | |
| 59-197623 | 11/1984 | Japan . | |
| 60-159423 | 8/1985 | Japan . | |

Primary Examiner—Richard Lorence
Attorney, Agent, or Firm—Armstrong, Nikaido, Marmelstein, Kubovcik & Murray

[57] ABSTRACT

A release bearing mechanism of a clutch of pull-type comprises a release bearing including an inner race provided with a cylindrical extension, a cylindrical wedge collar disposed around the cylindrical extension, a lever plate disposed around the wedge collar. The wedge collar and the lever plate being movable through a predetermined axial distance relative to each other. The lever plate being axially immovably connected to the diaphragm spring. The wedge collar includes engagement portions adapted to engage the cylindrical extension and the lever plate. The cylindrical extension, wedge collar and lever plate are formed to be assembled and disassembled by axially relatively shifting.

3 Claims, 2 Drawing Sheets

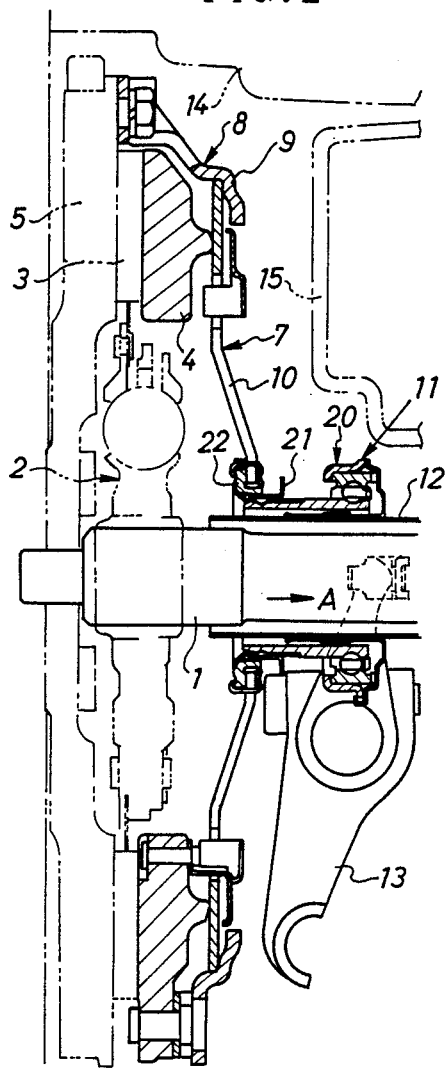
FIG. 2
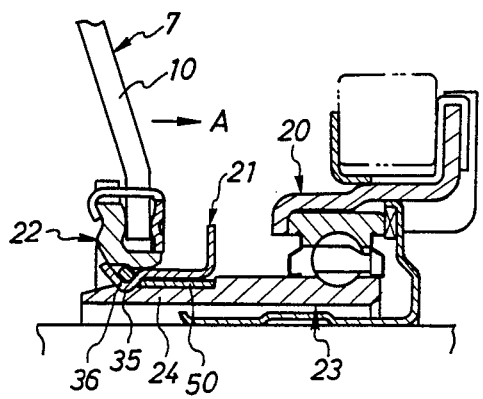
FIG. 1
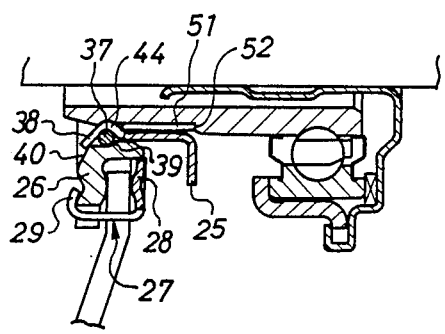

RELEASE MECHANISM OF A CLUTCH

BACKGROUND OF THE INVENTION

The present invention relates to a release mechanism of a friction clutch used in automobiles and others, and particularly, of a pull-type clutch, in which a diaphragm spring is pulled by the release mechanism for releasing the clutch.

The diaphragm spring is, as well known, a member for biasing a pressure plate toward a friction facing of a clutch disk. The clutch of the pull type is released when a release bearing pulls the inner periphery of the diaphragm spring axially outwardly, i.e., away from the clutch disk.

An example of the release bearing mechanism for the pull type clutch is disclosed in Japanese Patent Application No. 59-197623 (French Patent Application No. 8305848). In this mechanism, a cylindrical connecting member is provided at an inner periphery of the diaphragm spring. An extension of an inner race of a release bearing is fitted into the connecting member. The connecting member and the extension are connected by means of a ring member similar to a snap ring.

In this structure, the release bearing and the diaphragm spring can be assembled and disassembled by removing and re-attaching the ring member.

In the above structure, because the connecting member and the inner race are connected only through the ring member, large load is applied to the ring member in the clutch engaging operation. Further, because the ring member can not be stably fitted to the inner periphery of the connection member and/or the outer periphery of the inner race without a radial gap, the ring member may radially move or deviate with respect to the inner race and/or the connection member, in which case, partially excessive load may be applied to the ring member, resulting in breakage thereof.

Accordingly, it is an object of the invention to provide an improved structure, overcoming the above-noted disadvantages.

SUMMARY OF THE INVENTION

According to the invention, a release bearing mechanism of a clutch comprises a release bearing connected to an operation mechanism for applying an operating force to the bearing in a direction axially outwardly of the clutch, and including an inner race which is provided with a cylindrical extension extending in a direction axially inwardly of the clutch; a cylindrical wedge collar disposed around said cylindrical extension; and, a lever plate disposed around said wedge collar.

The wedge collar and the lever plate are movable through a predetermined axial distance relative to each other, and are provided at an axially outer portion of the wedge collar and at an axially inner portion of the lever plate with radially outward projections located at opposite sides of the diaphragm spring, respectively.

The lever plate is axially immovably connected to the diaphragm spring.

The cylindrical extension is provided at its outer periphery with a groove.

The wedge collar includes an inner engagement portion adapted to axially immovably engage the groove and an outer engagement portion adapted to engage the lever plate from axially inner side.

The wedge collar includes an elastically and radially deflectable portion, so that the radially outward deflection of the deflectable portion causes the movement of the inner engagement portion to an disengaged position.

The lever plate is operable to prevent the radially outward deflection of the wedge collar when the lever plate occupies the axially inner or forward position in the axially movable distance and is operable to permit the radially outward deflection of the wedge collar when the lever plate occupies the axially outer or rearward position in the axially movable distance.

A slip collar is interposed between the wedge collar and the cylindrical extension and positioned axially outside the inner engagement portion when the inner engagement portion engages the groove.

The inner engagement portion is capable of moving to a position around the slip collar when the elastically deflectable portion deflects radially outwardly.

The slip collar is operable to be moved along the cylindrical extension of the release bearing to a position in which the slip collar covers the groove when the inner engagement portion engages the slip collar.

According to the structure of the present invention, when the operation mechanism moves the release bearing axially outwardly or rearwardly for releasing the clutch, the wedge collar and the lever plate move in the same direction, so that the inner periphery of the diaphragm spring is pulled or moved axially outwardly.

BRIEF DESCRIPTION OF THE DRAWING

FIG. 1 is a sectional view of an embodiment of the invention;

FIG. 2 is a schematic sectional view of a clutch including the mechanism in FIG. 1.

DETAILED DESCRIPTION OF THE PREFERRED EMBODIMENTS

Figure 3:
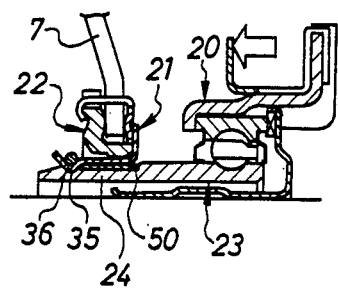
FIGS. 3, 4 and 5 are sectional views of the mechanism in FIG. 1 at different conditions in assembly and disassembly operation, respectively.

In a clutch as best illustrated in FIG. 2, an output shaft 1 is connected to a clutch disk 2 provided at the radially outer portion with a friction facing 3, which is adapted to be pressed axially of the shaft 1 by a pressure plate 4 onto a flywheel 5 of an engine (not shown) to engage the clutch. An annular diaphragm spring 7 is disposed at the rear side of the shaft 1 toward the friction facing 3. The diaphragm spring 7 is connected at its radially outer portion to the pressure plate 4, and is supported at its outer periphery by a fulcrum 9 of a clutch cover 8 fixed to the flywheel 5.

The diaphragm spring 7 is provided at its radially inner and middle portion with radial slits 10 (only one of which is illustrated), and is connected at the inner peripheral portion to a release bearing mechanism 11. The release bearing mechanism 11 is axially slidably fitted around a sleeve 12 disposed around the output shaft 1, and is connected to an release yoke lever 13 of a release mechanism. The yoke lever 13 is supported by a clutch housing 14, and is connected to a clutch pedal (not shown) through a link mechanism. An end of the clutch housing 14 opposite to the flywheel 5 is fixed to a transmission housing (not shown).

When the clutch pedal is depressed, the lever 13 moves the release bearing mechanism 11 axially of the shaft 1 and outwardly from the clutch 2 as indicated by an arrow A in FIG. 1, so that the release bearing mechanism 11 pulls the inner periphery of the diaphragm spring 7 axially of the shaft 1 and outwardly from the clutch 2.

The release bearing mechanism 11 includes a bearing 20, a wedge collar 21 and a lever plate 22. As will be detailed later, in the assembly stage or operation, the wedge collar 21 and the lever plate 22 are pre-assembled and fixed to the diaphragm spring 7 to form an assembled structure or unit including the diaphragm spring 7 and the clutch cover 8 and fixed to the flywheel 5. The bearing 20 is pre-assembled and fixed together with the sleeve 12 and the lever 13 to the clutch housing 14. These structures are coaxially joined and fixed together, after they are independently pre-assembled.

Referring to FIG. 1, the bearing 20 is located axially of the sleeve 12 outside (righthand in FIG. 1) the inner periphery of the diaphragm spring 7. An inner race 23 of the bearing 20 has an integral cylindrical extension 24, which is projected axially inwardly into the inner periphery of the diaphragm spring 7. The outer peripheral surface of the extension 24 is fitted into the wedge collar 21. The wedge collar 21 is a substantially cylindrical member, and is integrally provided at the axially outer end with a radially outward projection or finger 25. The lever plate 22 is fitted around the cylindrical outer peripheral surface of the wedge collar 21, and is integrally provided at the axially inner end with a radially outward projection or flange 26. The projections or flanges 25 and 26 are located at positions axially outside and inside the diaphragm spring 7, respectively.

The flange 26 is axially immovably connected to the diaphragm spring 7 by a support plate 27, which includes an annular body 28 and a plurality of bent projections 29 integrally provided at the outer periphery of the body 28. The body 28 is seated on the axially outer surface of the inner peripheral portion of the diaphragm spring 7. The projections 29 extend from the body 28 through the slits 10 in the diaphragm spring 7 to the outer periphery of the flange 26, and are bent at the ends thereof to engage the axially inner surface of the flange 26, respectively.

In the assembled embodiment in FIG. 1, an axial space is formed between the flange 25 and the annular body 28, so that the wedge collar 21 is movable through a predetermined axial distance relatively to the lever plate 22.

The extension 24 is provided at the outer peripheral surface of the end portion with a groove 35 having a substantially V-shaped section. The wedge collar 21 includes a first or inner engagement portion 36 which engages the groove 35. The engagement portion 36 is formed by a bent portion of the collar 21 which is projected radially inwardly and has a substantially V-shaped section. The portion 36 is annularly and continuously formed in the collar 21.

The outer peripheral surface of the engagement portion 36 forms an annular groove, into which a snap ring is fitted. An end portion 38 of the wedge collar 21 is projected axially inwardly beyond the snap ring 37 and is enlarged into a tapered shape. This prevents the snap ring 37 from dropping axially inwardly from the wedge collar 21. The lever plate 22 is also provided with an annular stepped portion 39 engaging the axially outward side of the snap ring 37.

The lever plate 22 is provided at the inner periphery of its axially inner portion with a tapered guide surface 40 adjacent and opposed to the tapered end portion 38. In the operating condition in FIG. 1, the guide surface 40 is engaged with the outer peripheral surface of the end portion 38.

The wedge collar 21 is provided with circumferentially spaced slots or slits 44 (only one of which is illustrated), which extend from the axially inner edge of the wedge collar 21 to an axially middle portion thereof. This permits elastic deflection of the end portion 38 of the wedge collar 21 outwardly and inwardly for facilely shifting the engagement portion 36.

In the operating condition in FIG. 1, the end portion of the inner race extension 24 engages the wedge collar 21, so that the end portion 38 is prevented from moving radially inwardly and thus, from disengaging from the lever plate 22. Further, the lever plate 22 engaging the outer peripheries of the snap ring 37 and the engagement portion 36 prevents the engagement portion 36 from deflecting radially outwardly and thus, disengaging from the groove 35. Therefore, when the bearing 20 is axially shifted by the lever 13 (FIG. 2), the wedge collar 21 and the lever plates 22 move in the same direction to move the radially inner portion of the diaphragm spring 7. Thus, the engaged or disengaged conditions of the clutch is controlled.

Further, in the present invention, a slip collar 50 is interposed between the wedge collar 21 and the extension 24. An axial slit 51 is formed in the cylindrical wall of the slip collar 50, so that the collar 50 may elastically deflect in the radially inward and outward directions. In the assembled condition in FIG. 1, the slip collar 50 is axially adjacent to the engagement portion 36. The outer diameter of the portion of the extension 24 around which the slip collar 50 is engaged is smaller than that of the portion axially outside the collar 50, and a stepped portion 52 is formed between those portions. In the condition in FIG. 1, an end of the slip collar 50 is in contact with or adjacent to the stepped portion 52 which forms a stopper means for slip collar 50. The outer diameter of the above-mentioned portion of the extension 24 axially outside the stepped portion 52 is substantially same as that of the slip collar 50.

An disassembly operation is performed as follows. As a first step, the lever 13 in FIG. 2 is moved beyond an ordinary movement section or distance in which the lever 13 is moved for engaging and disengaging the clutch, so that the bearing 20 is pushed axially inwardly from the position shown in FIG. 1, in which the clutch is engaged, with respect to the diaphragm spring 7. Whereby, the wedge collar 21 moves together with the bearing 20 to a position illustrated in FIG. 3. In the condition in FIG. 3, the lower plate 22 is located at axially outermost position with respect to the wedge collar 21, and the guide surface 40 and the portion adjacent thereto are located at a position nearly axially outside the end portion 38 and the snap ring 37, in which the surface 40 and the adjacent portion do not prevent the radially outward deflection of the engagement portion 36.

Figure 4:
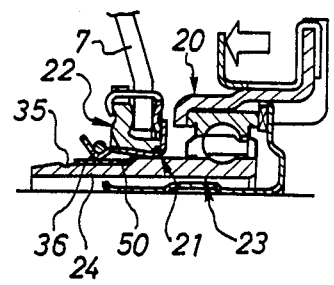
Figure 4:
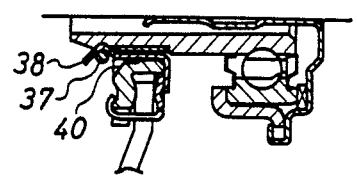

The bearing 20 is further pushed in the above-mentioned direction, so that the engagement portion 36 passes over the inclined surface of the groove 35 and the end portion of the slip collar 50 to engage the outer peripheral surface of the slip collar 50, as shown in FIG. 4.

Figure 5:
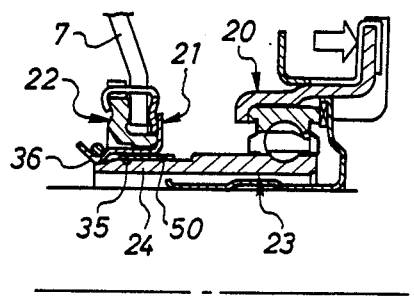
Figure 5:
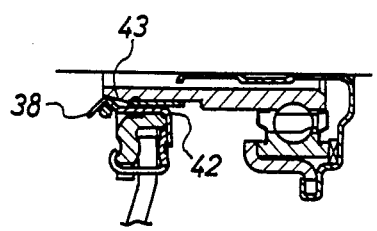

Then, the extension 24 is pulled away from the wedge collar 21. This pulling-away operation can be performed automatically by detaching or disassembling the transmission from the engine. When the extension 24 is pulled away, the slip collar 50 engaging the inner periphery of the wedge collar 21 moves axially inwardly to a position in which it covers the groove 35 with respect to the extension 24. Therefore, the engagement portion 36, for example as shown in FIG. 5, does not engage the groove 35 and is disengaged axially inwardly from the extension 24.

Various structures can be utilized for moving the slip collar 50 together with the wedge collar 21 as described above. For example, the slip collar 50 and the extension 24 may be constructed to form a slight space therebetween in the condition in FIG. 4. The slip collar 50 and the extension 24 may be in contact with each other in the condition in FIG. 4, in which case roughness of the contact surfaces are appropriately set so that the friction force between the slip collar 50 and the extension 24 may be smaller than that between the slip collar 50 and the wedge collar 21. The slip collar 50 may be provided at the outer peripheral surface with a shallow or concave which the engagement portion 36 engages in the condition in FIG. 4.

In the subsequent disassembly of the wedge collar 21 from the lever plate 22, the wedge collar 21 is pulled axially outwardly with respect to the lever plate 22. Since the inner race 23 has been removed from the wedge collar 21, the end portion 38 and the snap ring 37 can elastically deflect radially inwardly. Thus, when the wedge collar 21 is pulled, the end portion 38 and the snap ring 37 are guided and moved radially inwardly by the guide surface 40, so that the wedge collar 21 is disengaged from the lever plate 22.

An assembly operation is performed in the sequence reverse to the that of the disassembly operation. The wedge collar 21 is fitted into the inner race 23 after the wedge collar 21 is engaged with the lever plate 22. In the engaging operation of the wedge collar 21 to the lever plate 22, the end portion 38 initially contacts the inner peripheral portion of the end of the lever plate 22 and is deflected radially inwardly. The lever plate 22 is provided at the above inner peripheral portion of its end with a tapered guide surface 42 (FIG. 5) for facilitating the radially inward deflection of the end portion 38. In the subsequent fitting operation of the extension 24 into the wedge collar 21, the end of the extension 24 initially contacts and deflects the engagement portion 36 radially outwardly. The extension 24 is provided at the outer peripheral portion of tis end with a tapered guide surface 43 for facilitating that deflection.

According to the invention, as described hereinbefore, the inner race 23 of the release bearing 20 is fitted into the wedge collar 21, which engages the lever plate 22 connected to the diaphragm spring 7. The inner and outer engagement portions of the wedge collar 21, which engage the inner race 23 and the lever plate 22, are radially oppositely supported by the lever plate 22 and the inner race 23, respectively. Therefore, those members are radially stably and rigidly engaged together, resulting in a higher connecting strength, compared with conventional connecting structure using only one radially unstable ring.

Since the bearing 20, wedge collar 21 and lever plate 22 can be assembled and disassembled by axially relatively shifting, the assembly and disassembly operation can be facilely performed.

Further in the present invention, since the slip collar 50 prevents the engagement portion 36 from engaging the groove 35 in the disassembly operation, it is not necessary to remove the bearing 20 from the transmission in both of the assembly and disassembly operations.

Therefore, the assembly and disassembly operations can be remarkably simple, and the structure can also be simple. If the bearing 20 were adapted to be assembled together with the wedge collar 21 and others to the diaphragm 7 when the transmission including the output shaft 1 was removed, the output shaft 1 may collide against and break the inner periphery of the bearing mechanism 11. However, such a problem can be prevented according to the invention.

Although the invention has been described in its preferred form with a certain degree of particularity, it is understood that the structure of the preferred form may be changed in the details of construction, and that the combination and arrangement of parts may be modified to without departing from the spirit and scope of the invention as hereinafter claimed.

What is claimed:

1. A release bearing mechanism of a clutch comprising:
    a release bearing connected to an operation mechanism for applying an operating force to the bearing in a direction axially outward of the clutch, and including an inner race which is provided with a cylindrical extension extending in a direction axially inwardly of the clutch;
    a cylindrical wedge collar disposed around said cylindrical extension;
    a lever plate connected to a diaphragm spring of the clutch and disposed around said wedge collar;
    said wedge collar and said lever plate being movable through a predetermined axial distance relative to each other, and provided at an axially outer portion of said wedge collar and at an axially inner portion of said lever plate with radially outward projections located at opposite sides of the diaphragm spring, respectively;
    said lever plate being axially immovably connected to the diaphragm spring;
    said cylindrical extension being provided at its outer periphery with a groove;
    said wedge collar including an inner portion for engagement in said groove and an outer portion for engagement with an axially inner side of said lever plate;
    said wedge collar including an elastically and radially deflectable portion, so that the radially outward deflection of said deflectable portion causes the movement of said inner portion of said wedge collar to a disengaged position;
    said lever plate being operable to prevent the radially outward deflection of the wedge collar when said lever plate occupies the axially inner position in said axially movable distance and being operable to permit the radially outward deflection of the wedge collar when said lever plate occupies the axially outer position in said axially movable distance;
    a slip collar interposed between said wedge collar and said cylindrical extension, and positioned axially outside said inner engagement portion when said slip collar engages said groove;
    said inner engagement portion being capable of moving to a position around said slip collar when said elastically deflectable portion deflects radially outwardly; and
    said slip collar being operable to be moved along said cylindrical extension to a position in which said slip collar covers said groove when said inner engagement portion engages said slip collar.

2. A release bearing mechanism of a clutch comprising:
- a release bearing connected to an operation mechanism for applying an operating force to the bearing in a direction axially outward of the clutch, and including an inner race which is provided with a cylindrical extension extending in a direction axially inwardly of the clutch;
- a cylindrical wedge collar disposed around said cylindrical extension;
- a lever plate connected to a diaphragm spring of the clutch and disposed around said wedge collar;
- said wedge collar and said lever plate being movable through a predetermined axial distance relative to each other, and provided at an axially outer portion of said wedge collar and at an axially inner portion of said lever plate with radially outward projections located at opposite sides of the diaphragm spring, respectively;
- said lever plate being axially immovably connected to the diaphragm spring;
- said cylindrical extension being provided at its outer periphery with a groove;
- said wedge collar including an inner engagement portion adapted to axially immovably engage said groove and an outer engagement portion adapted to engage said lever plate from an axially inner side;
- said wedge collar including elastically and radially deflectable portions, so that the radially outward deflection of said deflectable portion causes the movement of the inner engagement portion to a disengaged position;
- said lever plate being operable to prevent the radially outward deflection of the wedge collar when said lever plate occupies the axially inner position in said axially movable distance and being operable to permit the radially outward deflection of the wedge collar when said lever plate occupies the axially outer position in said axially movable distance;
- a slip collar interposed at a predetermined position between said wedge collar and said cylindrical extension, and positioned axially outside said inner engagement portion when said inner engagement portion engages said groove;
- said inner engagement portion being capable of moving to a position around said slip collar when said elastically deflectable portion deflects radially outwardly; and
- a stopper means on said cylindrical extension for preventing said slip collar moving axially outwardly from said predetermined position with respect to said cylindrical extension;
- said slip cover being movable along said cylindrical extension to a position in which said slip collar covers said groove when said wedge collar is moved inwardly and said inner engagement portion of said wedge collar is disengaged from said groove.

3. A release bearing mechanism of claim 2 wherein a space is provided between said slip collar and said cylindrical extension when said wedge collar is disengaged from said groove.

* * * * *